(12) United States Patent
Ahn et al.

(10) Patent No.: US 12,704,178 B2
(45) Date of Patent: Aug. 11, 2026

(54) MOLDED SEAL BOOTS, SEALED STRUCTURES, AND METHODS FOR SEALING

(71) Applicant: The Boeing Company, Arlington, VA (US)

(72) Inventors: Jonathan Y. Ahn, Seattle, WA (US); Marianne E. Wilkinson, Redmond, WA (US); Jesse R. Wiseman, Snohomish, WA (US); Tho N. Dang, Lynnwood, WA (US); Korey J. Harbke, Everett, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/888,353

(22) Filed: Sep. 18, 2024

(65) Prior Publication Data

US 2026/0078823 A1 Mar. 19, 2026

(51) Int. Cl.
*F16J 15/06* (2006.01)

(52) U.S. Cl.
CPC .................................... *F16J 15/06* (2013.01)

(58) Field of Classification Search
CPC ........... F16J 15/06; F16J 15/061; F16J 15/062
See application file for complete search history.

(56) References Cited

U.S. PATENT DOCUMENTS 2,824,664 A * 2/1958 Dunsmoor ........... B64D 37/005 220/681
4,449,267 A 5/1984 Siemion
5,703,154 A 12/1997 Davis et al.
6,536,834 B2 3/2003 Yamashita et al.
8,973,307 B2 3/2015 Eguchi
9,206,904 B2 12/2015 Lee et al.
9,415,854 B2 8/2016 Yokoi
2003/0087048 A1 5/2003 Chaussade et al.
2006/0150523 A1 7/2006 Matthies
2008/0067288 A1 3/2008 Eberth et al.
2012/0276362 A1 11/2012 Denavit et al.
2019/0359044 A1 11/2019 Roux et al.
2021/0262568 A1* 8/2021 Wu ........................... B64C 3/34
2021/0316839 A1* 10/2021 Albright ............. B29C 45/0046
2022/0325142 A1* 10/2022 Moyer ...................... B64C 7/00
2024/0082870 A1* 3/2024 Ahn .................... B05B 13/0627
2025/0196994 A1* 6/2025 Ahn .......................... B64F 5/10

FOREIGN PATENT DOCUMENTS

EP 0696523 A1 2/1996

OTHER PUBLICATIONS

Eurpoean Patent Office: Extended European Search Report, App. No. 25188393.0 (Dec. 2, 2025).

* cited by examiner

*Primary Examiner* — Gilbert Y Lee
(74) *Attorney, Agent, or Firm* — Walters & Wasylyna LLC

(57) ABSTRACT

A seal boot includes a base and a toe that extends from the base. The seal boot includes a fillet surface that is formed by the base and the toe. The seal boot includes a first fay surface that is at least partially formed by the base. The seal boot includes a second fay surface that is at least partially formed by the toe.

20 Claims, 13 Drawing Sheets

MOLDED SEAL BOOTS, SEALED STRUCTURES, AND METHODS FOR SEALING

FIELD

The present disclosure relates generally to barrier seals and, more particularly, to molded seal boots, structures sealed using molded seal boots, and methods for sealing.

BACKGROUND

Seals are used in many applications to form a fluid tight barrier. In aircraft manufacturing, seals serve as a fuel barrier to store fuel within the wing of the aircraft. For example, sealant is used to seal a joint between the spar and skin of the wing to form an in-wing fuel tank. However, the sealant is traditionally applied along the joint after the spar and skin are connected, which requires a mechanic to access confined spaces within the wing for extended periods of time. Accordingly, those skilled in the art continue with research and development efforts in barrier seals and methods for sealing structures.

SUMMARY

Disclosed are examples of a seal boot, a sealed structure, and a method for sealing a structure. The following is a non-exhaustive list of examples, which may or may not be claimed, of the subject matter according to the present disclosure.

In an example, the disclosed seal boot includes a base and a toe that extends from the base. The seal boot includes a fillet surface that is formed by the base and the toe. The seal boot includes a first fay surface that is at least partially formed by the base. The seal boot includes a second fay surface that is at least partially formed by the toe.

In an example, the disclosed structure includes a first component and a second component. The first component includes a first-component fay surface. The second component includes a second-component fay surface. The structure includes a joint formed between the first component and the second component. The structure includes a seal boot that is configured for forming a barrier seal over the joint between the first component and the second component. The seal boot includes a base and a toe that extends from the base. The seal boot includes a fillet surface that is formed by the base and the toe. The seal boot includes a first fay surface that is at least partially formed by the base. The first fay surface is coupled to the first-component fay surface. The seal boot includes a second fay surface that is at least partially formed by the toe. The second fay surface is coupled to the second-component fay surface.

In an example, the disclosed method includes steps of: (1) providing a seal boot that includes a base, a toe that extends from the base, a fillet surface that is formed by the base and the toe, a first fay surface that is at least partially formed by the base, and a second fay surface that is at least partially formed by the toe; (2) coupling the first fay surface of the seal boot to a first-component fay surface of a first component; (3) coupling the first-component fay surface and the second fay surface to a second-component fay surface of a second component; (4) and forming a barrier seal over a joint between the first component and the second component.

Other examples of the seal boot, the sealed structure, and the method will become apparent from the following detailed description, the accompanying drawings, and the appended claims.

DETAILED DESCRIPTION

Figure 1:
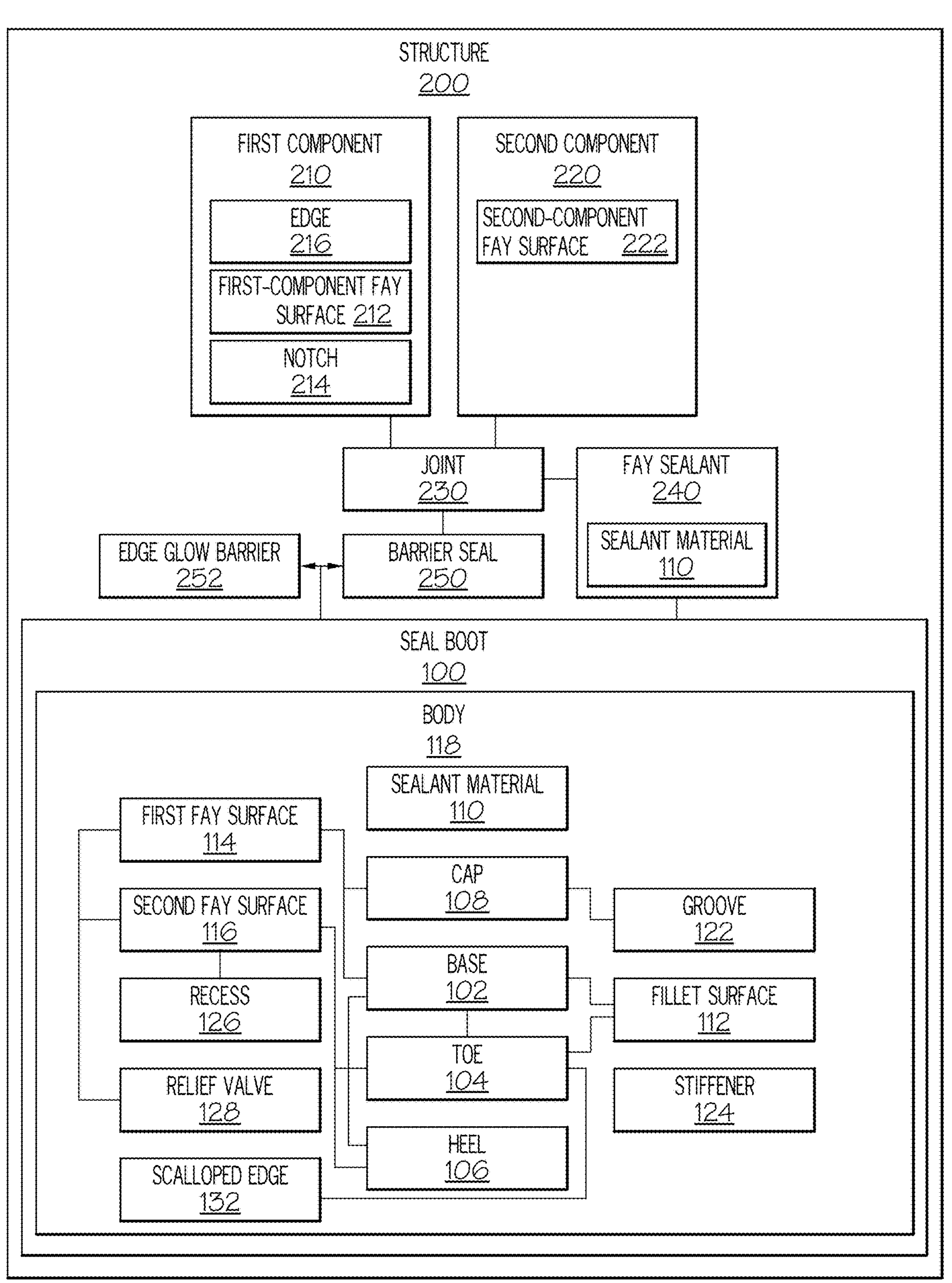
FIG. 1 is a schematic block diagram of an example of a structure and molded seal boot used to seal the structure.

Referring generally to FIGS. 1-21, by way of examples, the present disclosure is directed to a seal boot 100. By way of other examples, the present disclosure is also directed to a structure 200 sealed using the seal boot 100. By way of other examples, the present disclosure is further directed to a method 1000 for sealing the structure 200 using the seal boot 100.

Examples of the seal boot 100 and method 1000 advantageously provide a solution to install a fillet seal prior to assembly of the structure 200, thereby reducing the after-assembly application of barrier seals along structure joints. Benefits of the seal boot 100 and method 1000 include a decrease in cycle time, a reduction in processing time, and a decrease in labor. Examples of the seal boot 100 and method 1000 are particularly advantageous in applications where seals are needed within enclosed structures by decreases in amount of work in enclosed or confined spaces Examples of the seal boot 100 and method 1000 advantageously enable installing a fillet seal prior to assembly by using a solid, flexible seal structure. In various examples, the seal boot 100 is a pre-molded fillet seal-shaped strip that is applied to an edge 216 of a first component 210 prior to joining the first component 210 to a second component 220. In various examples, the seal boot 100 is fabricated using the same type or composition of a sealant material 110 as an adhesive sealant used to join the components of the structure 200. In various examples, while joining the components, a layer of adhesive sealant is applied to a first-component fay surface 212 of the first component 210 and an inward facing of the seal boot 100 for connection to a second-component fay surface 222 of the second component 220. In various examples, once the components are joined, the adhesive sealant between the components squeezes out and further adheres the seal boot 100 to the second component 220.

Referring now to FIGS. 1 and 3-21, the following are examples of the seal boot 100, according to the present disclosure. Examples of the seal boot 100 include a number of elements, features, and components. Not all of the elements, features, and/or components described or illustrated in one example are required in that example. Some or all of the elements, features, and/or components described or illustrated in one example can be combined with other examples in various ways without the need to include other elements, features, and/or components described in those other examples, even though such combination or combinations are not explicitly described or illustrated by example herein.

In one or more examples, the seal boot 100 is configured to be coupled to the first component 210 and the second component 220 of the structure 200 along a joint 230 formed between the first component 210 and the second component 220.

In one or more examples, the structure 200 is any one of various types of assembled or joined structures formed of a number of components. As illustrated in FIGS. 10-17 and 23, in one or more examples, the structure 200 is a fuel tank 1230 formed by or contained within a wing 1220 of an aircraft 1200 (e.g., an in-wing fuel tank) formed by one or more instances of a spar 1232 (e.g., first component 210) and one or more instances of a skin panel 1234 (e.g., second component 220).

Examples of the seal boot 100 and method 1000 advantageously enable installing a fillet seal prior to assembly of the fuel tank 1230 by using a solid, flexible seal structure. In various examples, the seal boot 100 is a pre-molded fillet seal-shaped strip that is applied to an edge 216 of the spar 1232 prior to joining the spar 1232 and the skin panel 1234. In various examples, the seal boot 100 is fabricated using the same type or composition of a sealant material 110 as a fay sealant 240 (e.g., adhesive sealant) used to join the seal boot 100 to the spar 1232 and the skin panel 1234 and used to join the spar 1232 and the skin panel 1234 together. In various examples, while joining the spar 1232 and the skin panel 1234, a layer of the fay sealant 240 is applied to an outer fay surface of the spar 1232 and an inward facing surface of the seal boot 100 for connection to the skin panel 1234. In various examples, once the spar 1232 and the skin panel 1234 are joined, the fay sealant 240 between the seal boot 100 and the skin panel 1234 squeezes out and further adheres the seal boot 100 to the skin panel 1234.

In one or more examples, the seal boot 100 includes a base 102 and a toe 104. In one or more examples, the toe 104 extends outward from the base 102. The base 102 is configured to contact and be coupled to the first component 210. The toe 104 is configured to contact and be coupled to the second component 220. In this way, with the first component 210 and the second component 220 coupled together, the seal boot 100 extends along and covers the joint 230 to form a barrier seal 250.

In one of more examples, the barrier seal 250 formed by the seal boot 100 is impermeable to fluids and/or forms a fluid-tight or fluid-resistant seal along the joint 230 where the first component 210 and the second component 220 make contact. In one or more examples, the barrier seal 250 formed by the seal boot 100 is liquid tight or liquid impermeable. In one or more examples, the barrier seal 250 formed by the seal boot 100 is gas tight or gas impermeable.

As illustrated in FIGS. 1 and 3-5, in one or more examples, the base 102 and the toe 104, in combination, generally form a body 118 of the seal boot 100. In one or more examples, the body 118 of the seal boot 100 is flexible. Flexibility of the body 118 enables the seal boot 100 to conform to a surface contour of the first component 210 and/or the second component 220 or to the shape of the joint 230.

Figures 14, 15, 16:
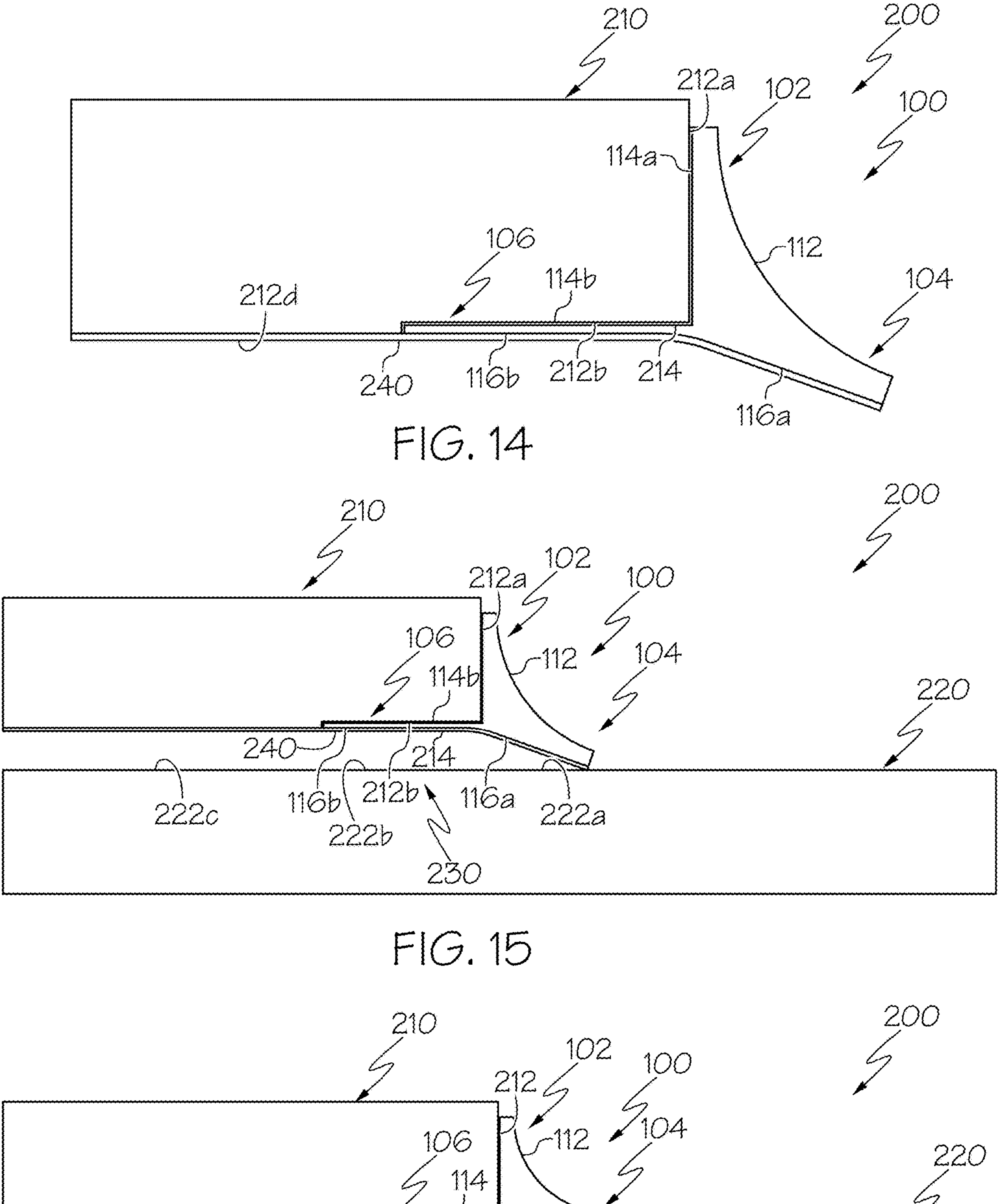
FIG. 14 is a schematic, elevation view of an example of the first component and an example of the molded seal boot.
FIG. 15 is a schematic, elevation view of an example of the first component, an example of a second component of the structure, and an example of the molded seal boot.
FIG. 16 is a schematic, elevation view of the example of the first component, the second component, and the molded seal boot of FIG. 15.
Figures 17, 18:
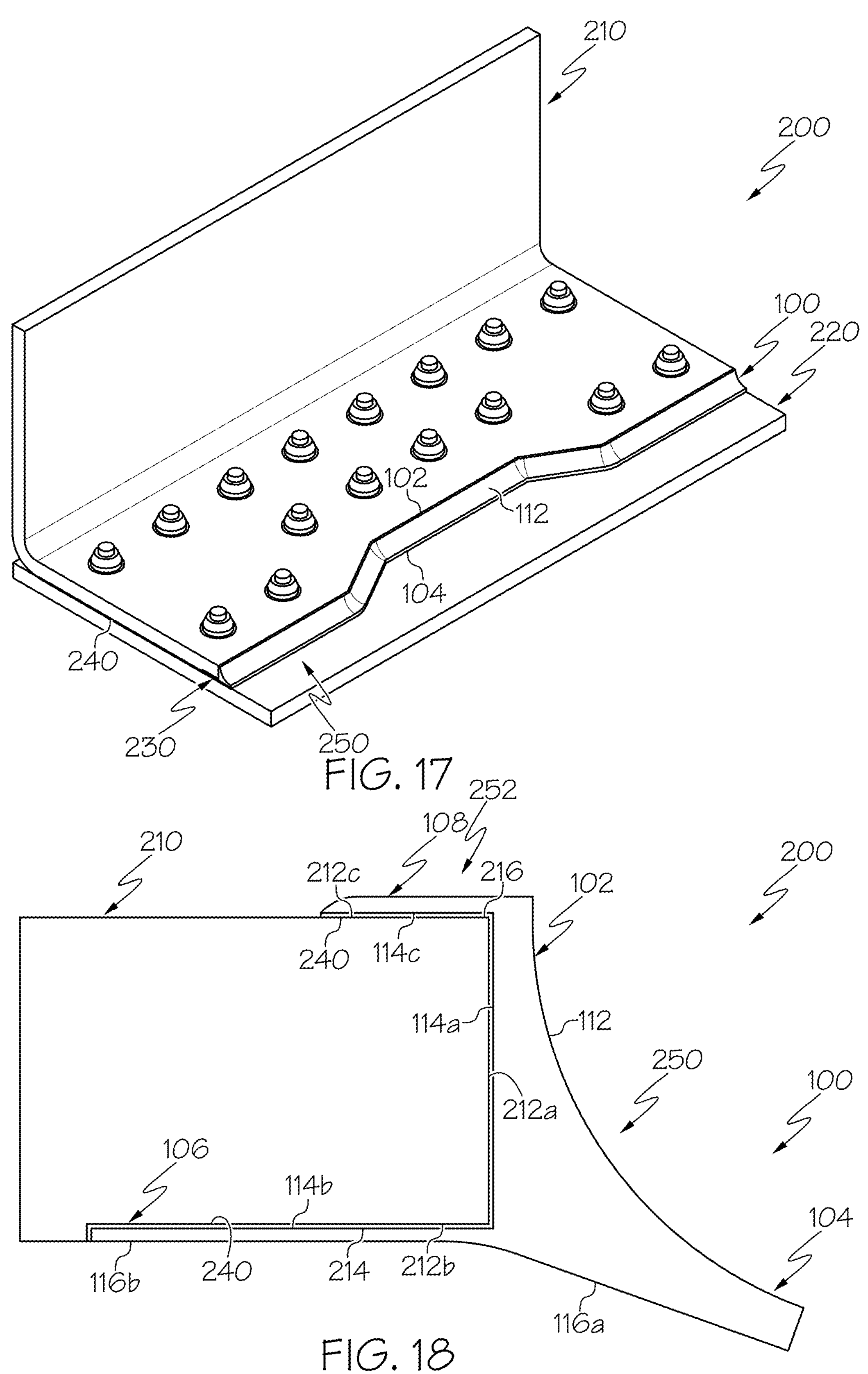
FIG. 17 is a schematic, perspective view of an example of the first component, an example of the second component of the structure, and an example of the molded seal boot.
FIG. 18 is a schematic, elevation view of an example of the first component and an example of the molded seal boot.

In one or more examples, the toe 104 is non-perpendicular and non-parallel to the base 102. In one or more examples, the toe 104 extends outward and downward from the lower end of the base 102. As best illustrated in FIGS. 14-16, the downward and outward angle of the toe 104 relative to the base 102 ensures proper contact with a surface of the second component 220.

In one or more examples, the seal boot 100 (e.g., body 118) includes a fillet surface 112. The fillet surface 112 is formed by the base 102 and the toe 104. For example, the fillet surface 112 forms an outwardly facing surface of the body 118 that extends from an end of the base 102 to an end of the toe 104. The fillet surface 112 is configured to extend along the joint 230 when the seal boot 100 is coupled to the first component 210 and the second component 220. In one or more examples, the fillet surface 112 is concave, for example, relative to a virtual plane that extends parallel to the joint 230. In one or more examples, the fillet surface 112 is at least approximately planar (e.g., flat), for example, relative to the virtual plane that extends parallel to the joint 230. In one or more examples, the fillet surface 112 can have other two-dimensional shapes (e.g., viewed along a longitudinal axis A of the seal boot 100), such as a complex contour or combination of curved and flat sections.

In one or more examples, the seal boot 100 includes a first fay surface 114. The first fay surface 114 is at least partially formed by the base 102. For examples, the first fay surface 114 forms a first inwardly facing surface of the body 118 that extends from an end of the base 102 to the toe 104. The first fay surface 114 is configured to extend along a mating portion of a first-component fay surface 212 of the first component 210 when the seal boot 100 is coupled to the first component 210. In one or more examples, the first fay surface 114 is at least approximately planar (e.g., flat). However, in other examples, the first fay surface 114 can have other two-dimensional shapes (e.g., viewed along the longitudinal axis A of the seal boot 100), such as curved, a complex contour, or combination of curved and flat sections that mate with the surface contour of the first component 210.

In one or more examples, the seal boot 100 includes a second fay surface 116. The second fay surface 116 is at least partially formed by the toe 104. For examples, the second fay surface 116 forms a second inwardly facing surface of the body 118 that extends from an end of the toe 104 to the base 102. The second fay surface 116 is configured to extend along a mating portion of a second-component fay surface 222 of the second component 220 when the seal boot 100 is coupled to the second component 220. In one or more examples, the second fay surface 116 is at least approximately planar (e.g., flat). However, in other examples, the second fay surface 116 can have other two-dimensional shapes (e.g., viewed along a longitudinal axis A of the seal boot 100), such as curved, a complex contour, or combination of curved and flat sections that mate with the surface contour of the second component 220.

For the purpose of the present disclosure, a surface (e.g., first fay surface 114 or second fay surface 116) being at least partially formed by a component (e.g., base 102 and/or toe 104) refers to at least a portion of the surface being formed by the component. As examples, a surface being at least partially formed by a component includes instances in which an entirety of the surface is formed by the component and instances in which one (e.g., first) portion of the surface is formed by one (e.g., first) component and another (e.g., second) portion of the surface is formed by another (e.g., second) component.

In one or more examples, the seal boot 100 includes a heel 106. In one or more examples, the base 102, the toe 104, and the heel 106 form the body 118 of the seal boot 100. In one or more examples, the heel 106 extends outward from the base 102 in a direction opposite the toe 104. In one or more examples, the heel 106 is at least approximately perpendicular to the base 102. The heel 106 is configured to contact and be coupled to the first component 210. When the seal boot 100 is coupled to the first component 210 and the second component 220 and the first component 210 and the second component 220 are coupled together, the heel 106 is configured to be situated (e.g., sandwiched) between the first component 210 and the second component 220. The heel 106 holds the seal boot 100 in place between the first component 210 and the second component 220 when the structure 200 is assembled.

In one or more examples, a portion of the first fay surface 114 is formed by the heel 106. For example, a first portion 114*a* of the first fay surface 114 is formed by the base 102 and a second portion 114*b* of the first fay surface 114 is formed by the heel 106. In these examples, the first portion 114*a* of the first fay surface 114 is configured to contact and to be coupled to a first portion 212*a* of the first-component fay surface 212 of the first component 210. In one or more examples, the first portion 114*a* and the second portion 114*b* of the first fay surface 114 are at least approximately perpendicular to each other, before the seal boot 100 is coupled to the first component 210 and after the seal boot 100 is coupled to the first component 210, such that a first (e.g., lower) corner is formed or shared by the first portion 114*a* and the second portion 114*b* or the first fay surface 114.

In one or more examples, a portion of the second fay surface 116 is formed by the heel 106. For examples, a first portion 116*a* of the second fay surface 116 is formed by the toe 104 and a second portion of the second fay surface 116 is formed by the heel 106. In these examples, the first portion 116*a* and the second portion 116*b* of the second fay surface 116 are configured to contact and to be coupled to the second-component fay surface 222 of the second component 220. In one or more examples, the first portion 116*a* and the second portion 116*b* of the second fay surface 116 are non-perpendicular and non-parallel (e.g., at an angle relative to each other) before the seal boot 100 is coupled to the second component 220. In one or more examples, the first portion 116*a* and the second portion 116*b* of the second fay surface 116 are at least approximately parallel after the seal boot 100 is coupled to the second component 220.

In one or more examples, the seal boot 100 includes a cap 108. In one or more examples, the base 102, the toe 104, the heel 106, and the cap 108 form the body 118 of the seal boot 100. In one or more examples, the cap 108 extends outward from the base 102. In one or more examples, the cap 108 extends outward from the base 102 in a direction opposite the toe 104, at least after the seal boot 100 is coupled to the first component 210. In one or more examples, the cap 108 is at least approximately perpendicular to the to the base 102, at least after the seal boot 100 is coupled to the first component 210. The cap 108 is configured to contact and be coupled to the first-component fay surface 212. When the seal boot 100 is coupled to the first component 210, the cap 108 is configured to wrap around, overlap, or otherwise extend over a corner or edge of the first component 210.

In one or more examples, a portion of the first fay surface 114 is formed by the cap 108. For example, a third portion 114*c* of the first fay surface 114 is formed by the cap 108. In these examples, the third portion 114*c* of the first fay surface 114 is configured to contact and to be coupled to a third portion 212*c* of the first-component fay surface 212 of the first component 210. In one or more examples, the first portion 114*a* and the third portion 114*c* of the first fay surface 114 are at least approximately perpendicular to each other, before the seal boot 100 is coupled to the first component 210 and after the seal boot 100 is coupled to the first component 210, such that a second (e.g., upper) corner is formed or shared by the first portion 114*a* and the third portion 114*c* or the first fay surface 114.

In one or more examples, the portions of the first-component fay surface 212 form an end of the first component 210, such as an end of a flange of the spar 1232. In one or more examples, the second portion 212*b* and the first portion 212*a* of the first-component fay surface 212 are at least approximately perpendicular such that a first (e.g., lower) corner or edge is formed or shared by the first portion 212*a* and the second portion 212*b*. In these examples, the first corner of the first component 210 formed by the first portion 212*a* and the second portion 212*b* of the first-component fay surface 212 mates with (e.g., fits in) the first corner of the seal boot 100 formed by the first portion 114*a* and the second portion 114*b* of the first fay surface 114.

In one or more examples, the third portion 212*c* and the first portion 212*a* of the first-component fay surface 212 are at least approximately perpendicular such that a second (e.g., upper) corner or edge is formed or shared by the first portion 212*a* and the third portion 212*c* of the first-component fay surface 212. In these examples, the second corner of the first component 210 formed by the first portion 212*a* and the third portion 212*c* of the first-component fay surface 212 mates with (e.g., fits in) the second corner of the seal boot 100 formed by the first portion 114*a* and the third portion 114*c* of the first fay surface 114.

In one or more examples, the base 102 and/or the cap 108 form an edge glow barrier 252 along the end of the first component 210 and, more particularly, along the second corner or edge of the first component 210 formed by the first portion 212*a* and the third portion 212*c* of the first-component fay surface 212. The edge glow barrier 252 is particularly beneficial in cases where the first component 210 is made of a composite material susceptible to edge glow effects or other electromagnetic effects.

Figure 9:
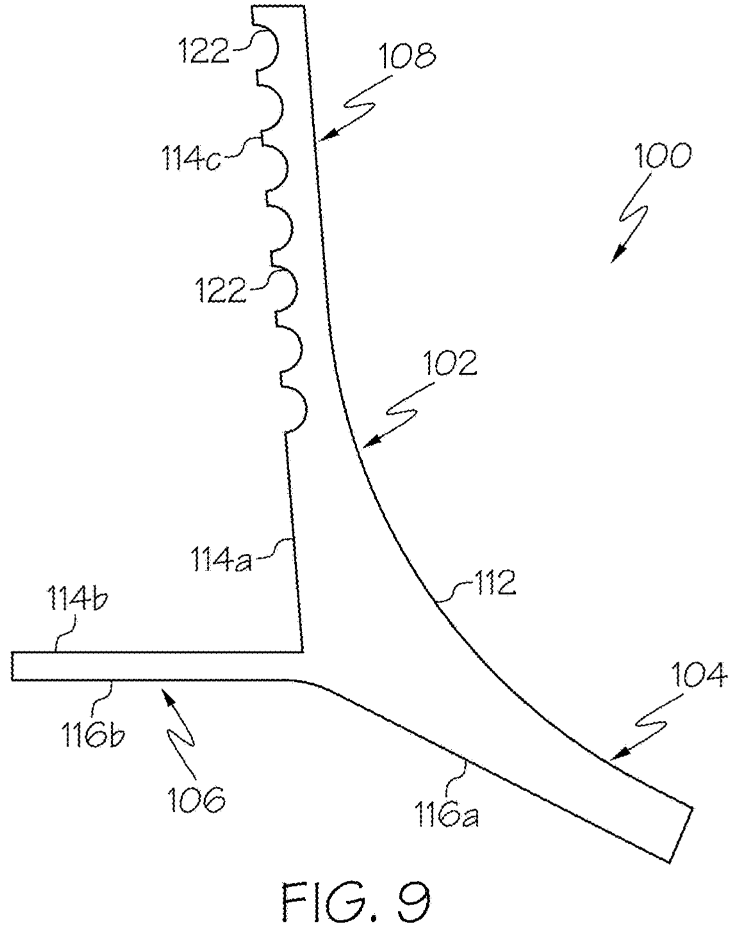
FIG. 9 is a schematic, elevation view of an example of the molded seal boot.

As illustrated in FIGS. 1 and 9, in one or more examples, the seal boot 100 includes one or more grooves 122. Each one of the grooves 122 is formed in the cap 108. In one or more examples, the grooves 122 are formed in (e.g., depend inwardly from) the portion of the first fay surface 114 formed by the cap 108 or proximate an intersection of the cap 108 and the base 102. Each of the grooves 122 is configured to enable the cap 108 to flex, bend, or fold over relative to the base 102 such that the cap 108 contacts and can be coupled to the third portion 212*c* of the first-component fay surface 212 of the first component 210. In one or more examples, the grooves 122 enable modification of the length of the base 102 and the cap 108 to follow or match variations in the dimension of the first portion 212*a* of the first-component fay surface 212 and/or a non-straight or contoured instance of the second corner or edge of the first component 210 formed in the first portion 212*a* and the third portion 212*c* of the first-component fay surface 212.

Figure 19:
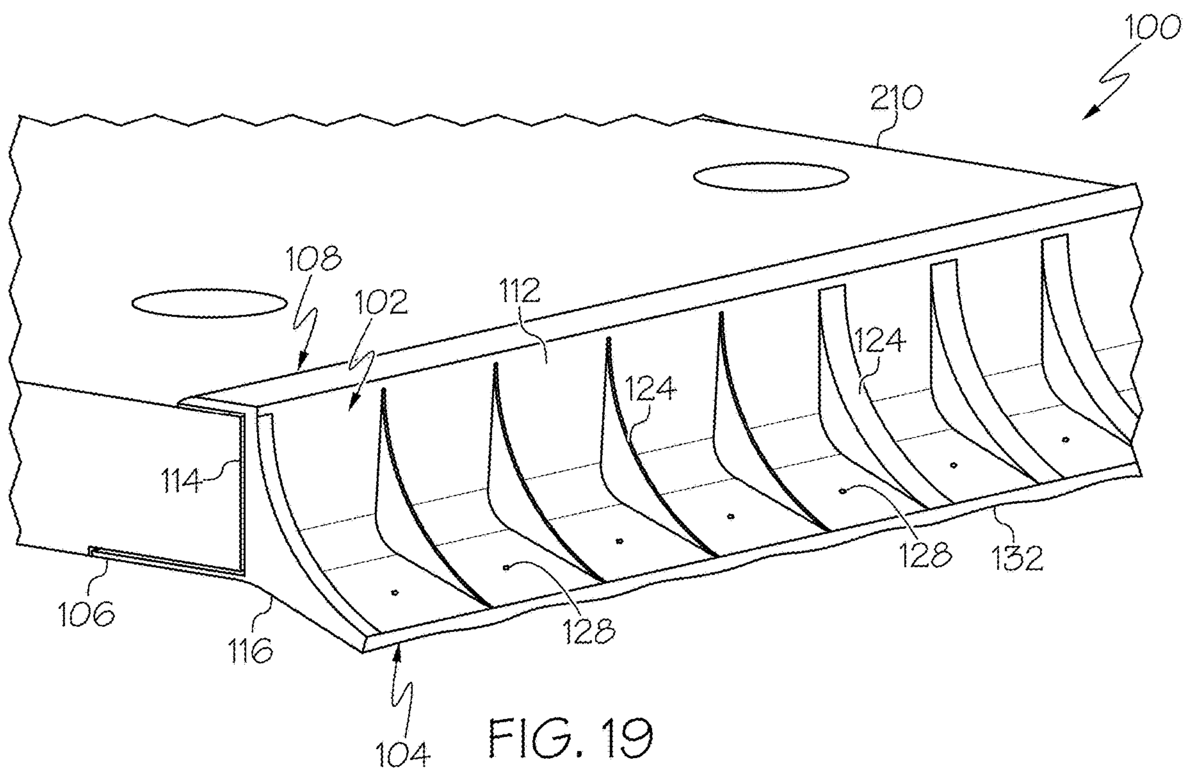
FIG. 19 is a schematic, perspective view of an example of the first component and an example of the molded seal boot.
Figure 21:
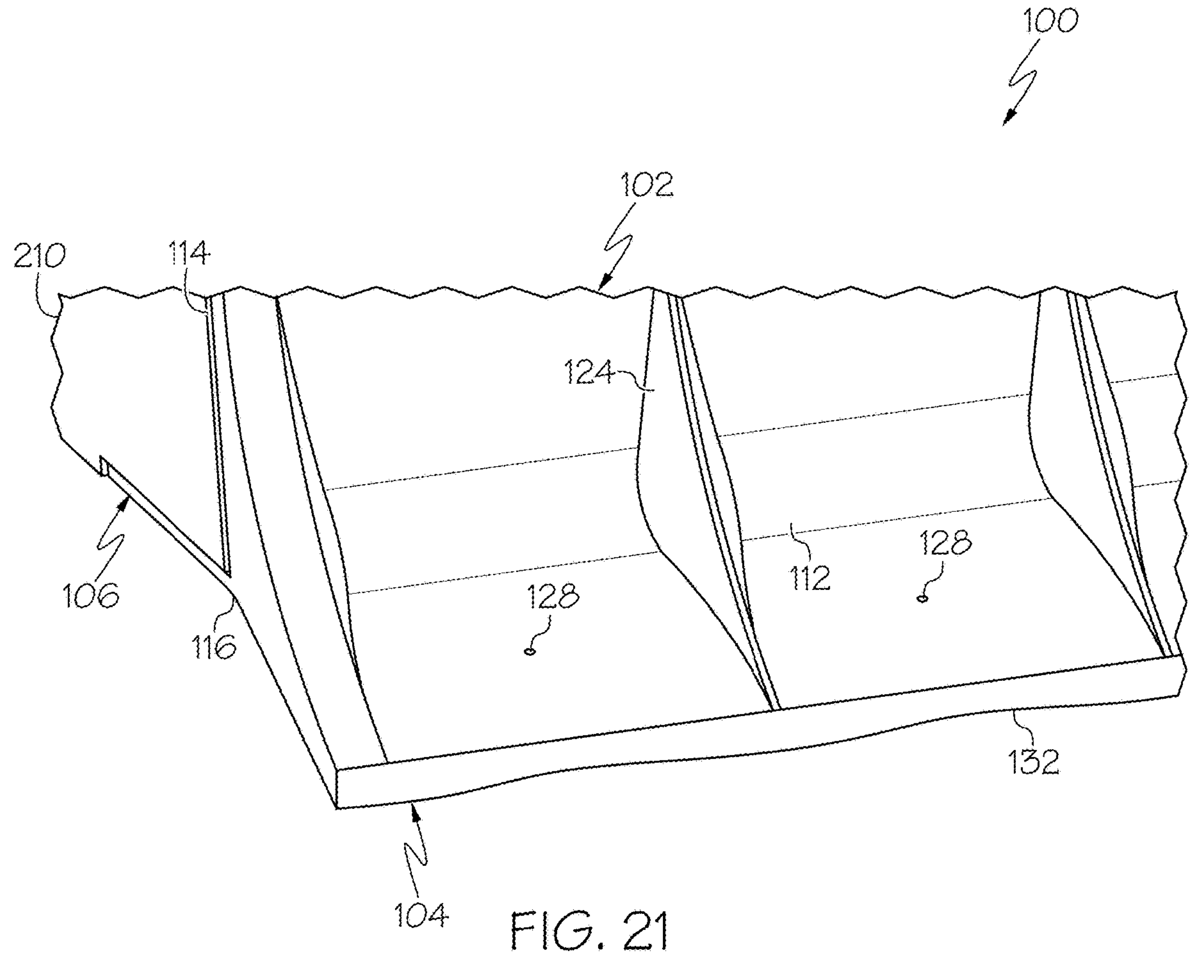
FIG. 21 is a schematic, perspective view of an example of a portion of the molded seal boot.

As illustrated in FIGS. 1, 19 and 21, in one or more examples, the seal boot 100 includes at least one instance of a stiffener 124. In one or more examples, the stiffener 124 extends outward from the fillet surface 112. In one or more examples, the stiffener 124 extends from proximate the end of the base 102 to proximate the end of the toe 104. The stiffener 124 maintains the shape of the seal boot 100. In one or more examples, the stiffener 124 maintains the relative angle between the base 102 and the toe 104. In one or more examples, the stiffener 124 promotes maintaining contact between the toe 104 and the second component 220 when the seal boot 100 and the second component 220 are coupled together. In one or more examples, the stiffener 124 can have various thicknesses. In one or more examples, the seal boot 100 includes a plurality of instances of the stiffener 124 that are spaced apart from one another along the length of the fillet surface 112.

Figure 20:
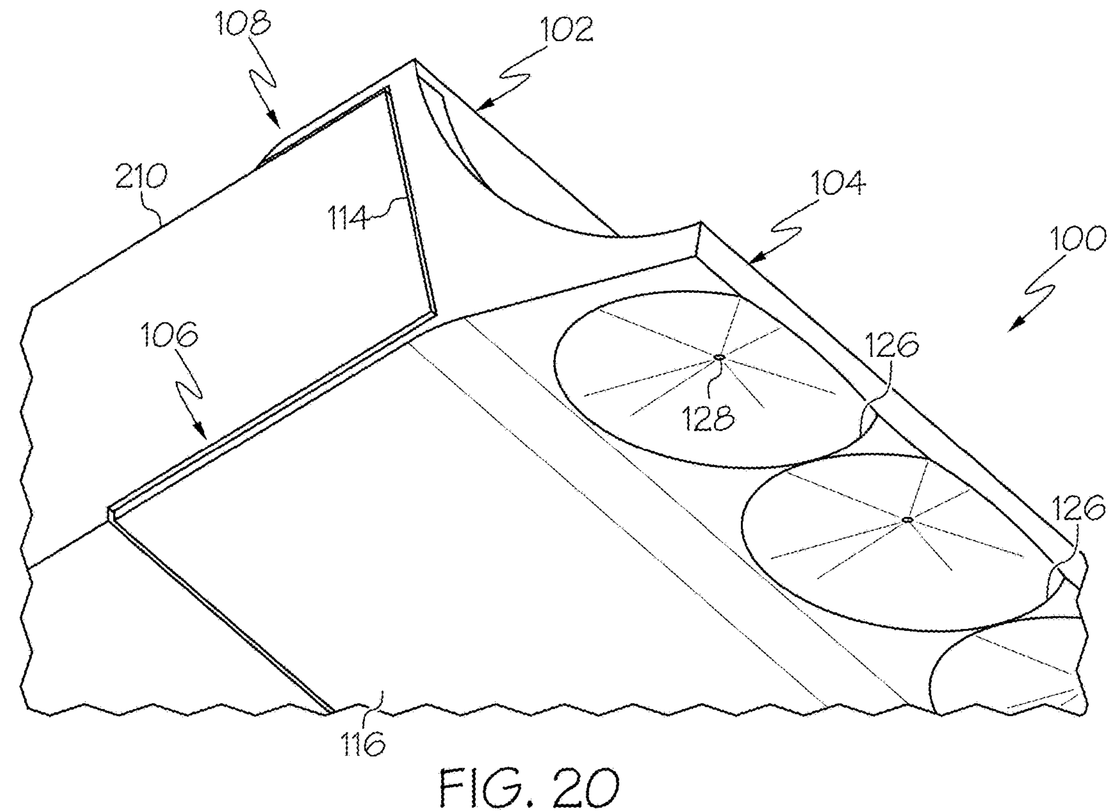
FIG. 20 is a schematic, perspective view of an example of the first component and an example of the molded seal boot.

As illustrated in FIGS. 1 and 20, in one or more examples, the seal boot 100 includes at least one instance of a recess 126. In one or more examples, the recess 126 is formed in the toe 104. In one or more examples, the recess 126 is formed in (e.g., depends inwardly from) a portion (e.g., first portion 116*a*) of the second fay surface 116 formed by the toe 104. In one or more examples, the recess 126 is a concave port formed on the first portion 116*a* of the second fay surface 116. In one or more examples, the recess 126 enables excess amounts of a fay sealant 240 (e.g., adhesive sealant) to collect and build up within the recess 126 and allows the toe 104 of the seal boot 100 to form a proper seat onto the second-component fay surface 222 of the second component 220. In one or more examples, the seal boot 100 includes a plurality of instances of the recess 126 that are spaced apart from one another along the length of toe 104.

As illustrated in FIGS. 1 and 19-21, in one or more examples, the seal boot 100 includes at least one instance of a relief valve 128. In one or more examples, the relief valve 128 is formed in the toe 104. In one or more examples, the relief valve 128 extends, inclusively, between the second fay surface 116 and the fillet surface 112. In one or more examples, the relief valve 128 enables excess amounts of the fay sealant 240 to squeeze out from under the toe 104 instead of trapping air bubbles, which can lead to leak paths through the barrier seal 250. In one or more examples, the relief valve 128 is aligned with and/or opens into the recess 126. In one or more examples, the seal boot 100 includes a plurality of instances of the relief valve 128 that are spaced apart from one another along the length of toe 104.

As illustrated in FIGS. 1, 19 and 21, in one or more examples, the seal boot 100 includes a scalloped edge 132. The scalloped edge 132 is formed along a corner or edge of the toe 104 formed by or shared by the fillet surface 112 and the second fay surface 116. In one or more examples, the scalloped edge 132 enables excess amounts of the fay sealant 240 squeeze out from under the toe 104.

In one or more examples, the seal boot 100 includes or is made of a sealant material 110. In one or more examples, the sealant material 110 is molded to form the seal boot 100. In one or more examples, the sealant material 110 is cured to form the seal boot 100.

In one or more examples, the seal boot 100 includes the longitudinal axis A. In one or more examples, the body 118 of the seal boot 100, including the base 102 and the toe 104, and the heel 106 and/or the cap 108 when present, extend along the longitudinal axis A. In one or more examples, the body 118 of the seal boot 100, including the base 102 and the toe 104, and the heel 106 and/or the cap 108 when present, are flexible along the longitudinal axis A. Flexibility of the body 118 enables the seal boot 100 to follow the contour of the first component 210 and/or of the joint 230 formed between the first component 210 and the second component 220.

Figure 3:
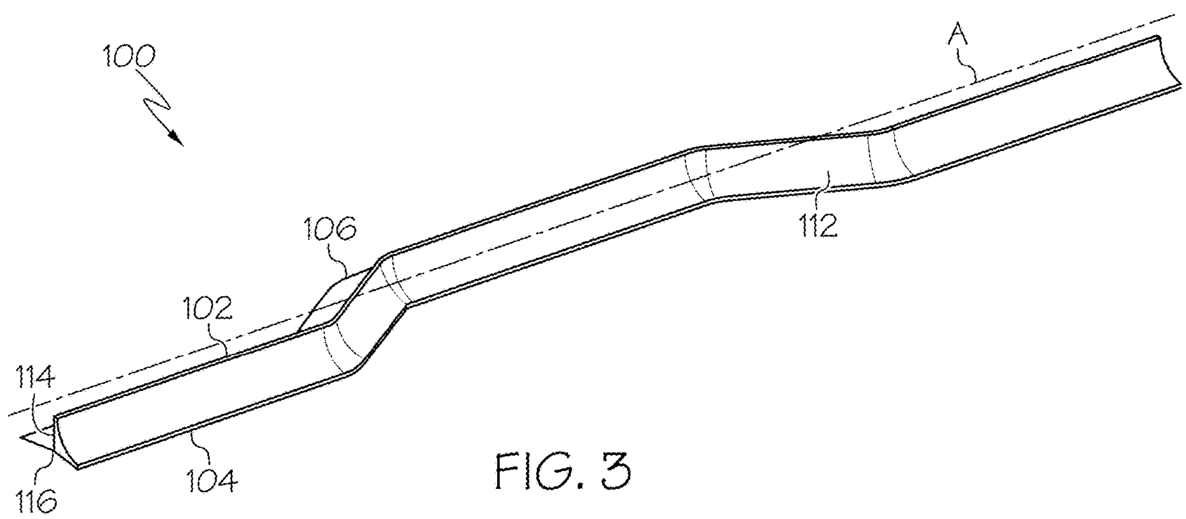
FIG. 3 is a schematic, perspective view of an example of a molded seal boot.
Figure 4:
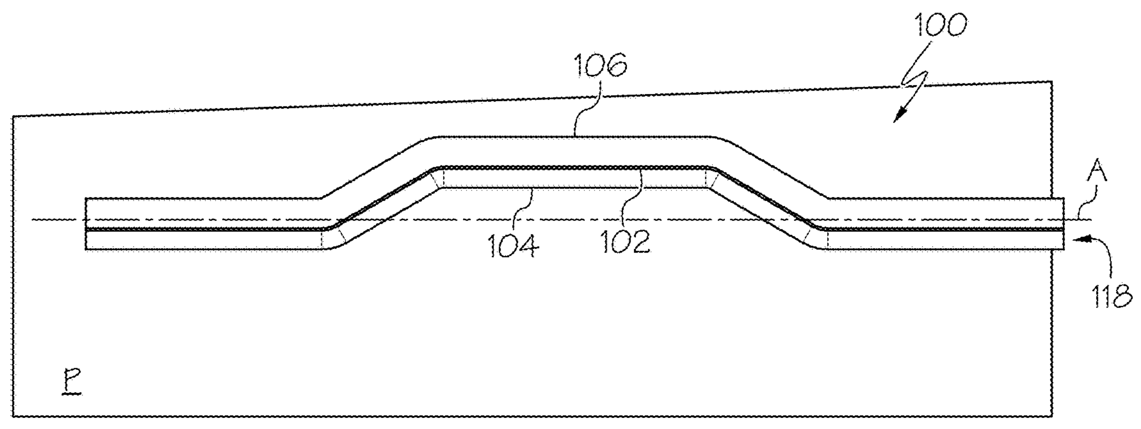
FIG. 4 is a schematic, plan view of an example of the molded seal boot.
Figure 5:
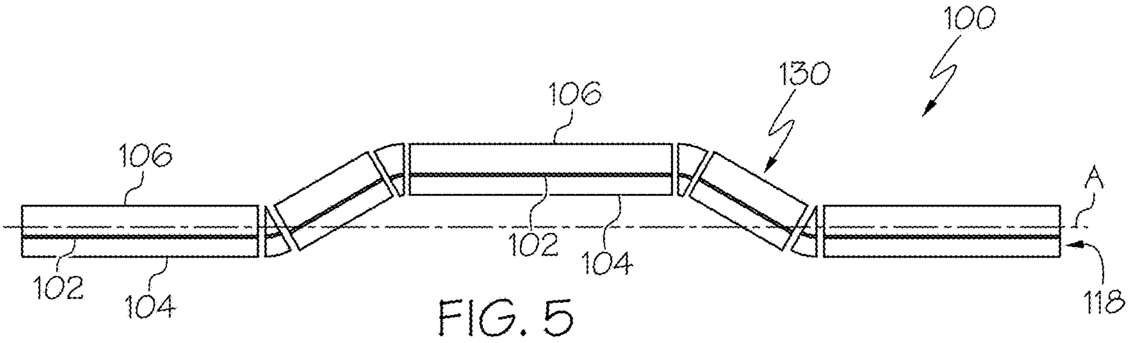
FIG. 5 is a schematic, plan view of an example of the molded seal boot.
Figure 6:
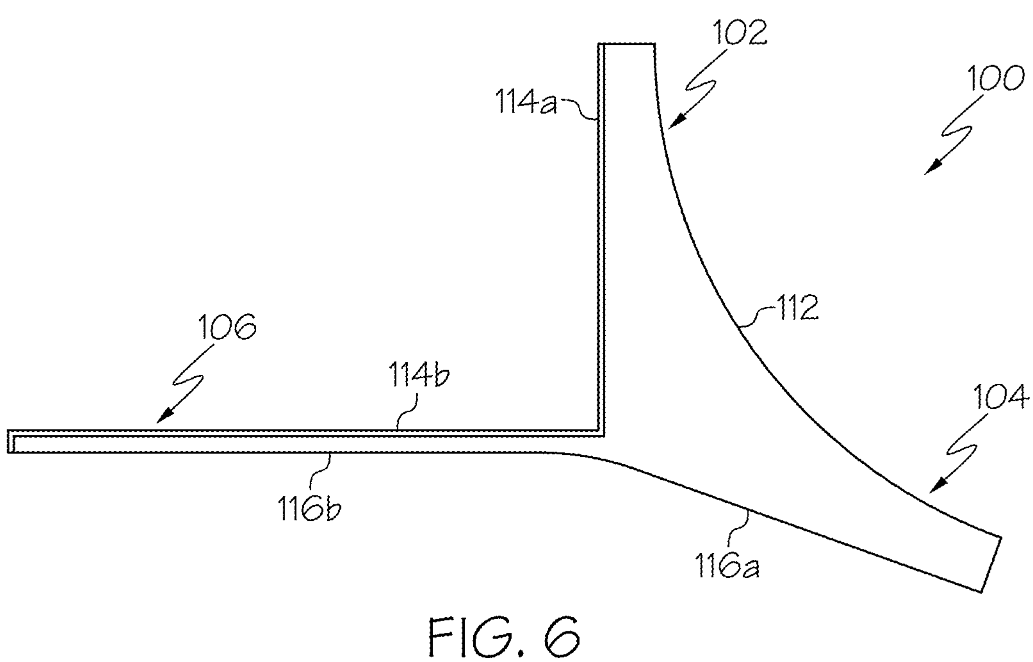
FIG. 6 is a schematic, elevation view of an example of the molded seal boot.
Figure 7:
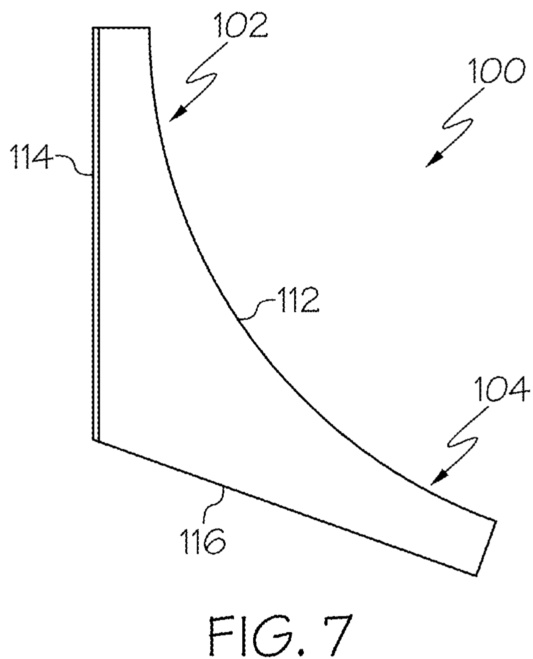
FIG. 7 is a schematic, elevation view of an example of the molded seal boot.
Figure 8:
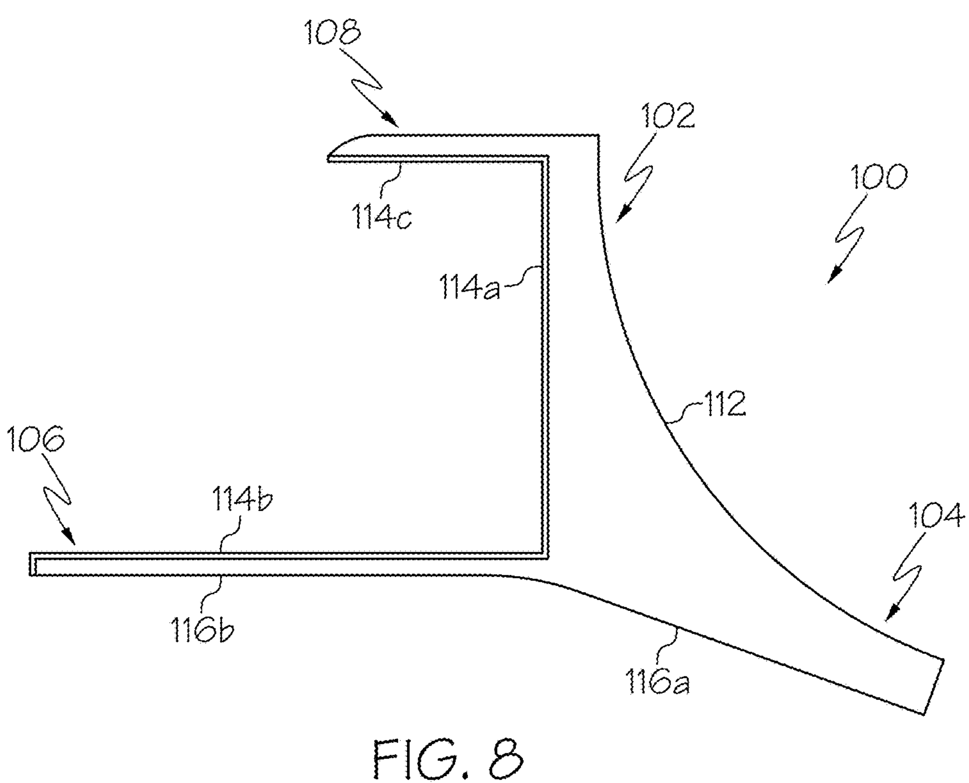
FIG. 8 is a schematic, elevation view of an example of the molded seal boot.
Figures 10, 11:
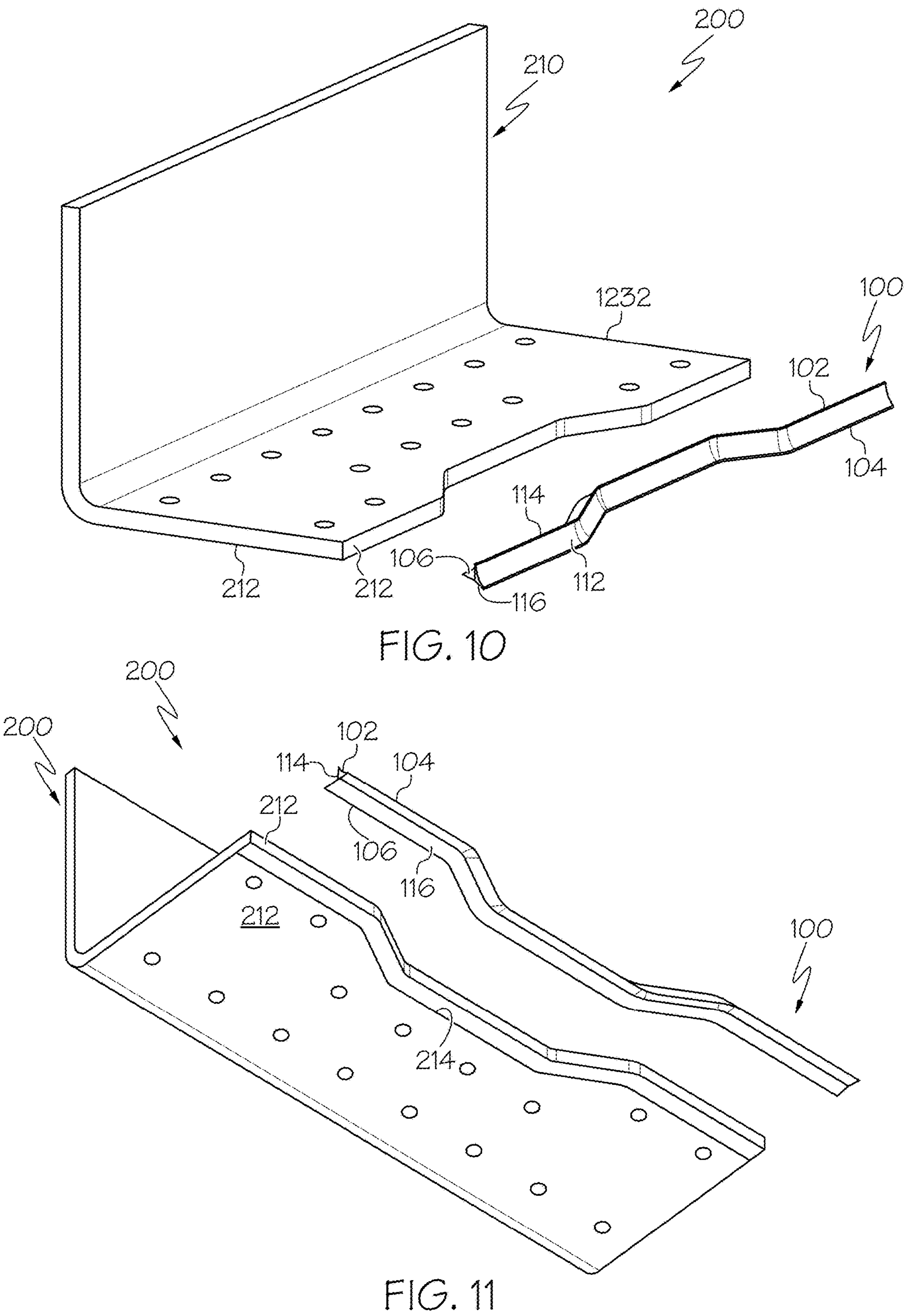
FIG. 10 is a schematic, perspective view of an example of a first component of a structure and an example of the molded seal boot.
FIG. 11 is a schematic, perspective view of the first component and the molded seal boot of FIG. 10.
Figures 12, 13:
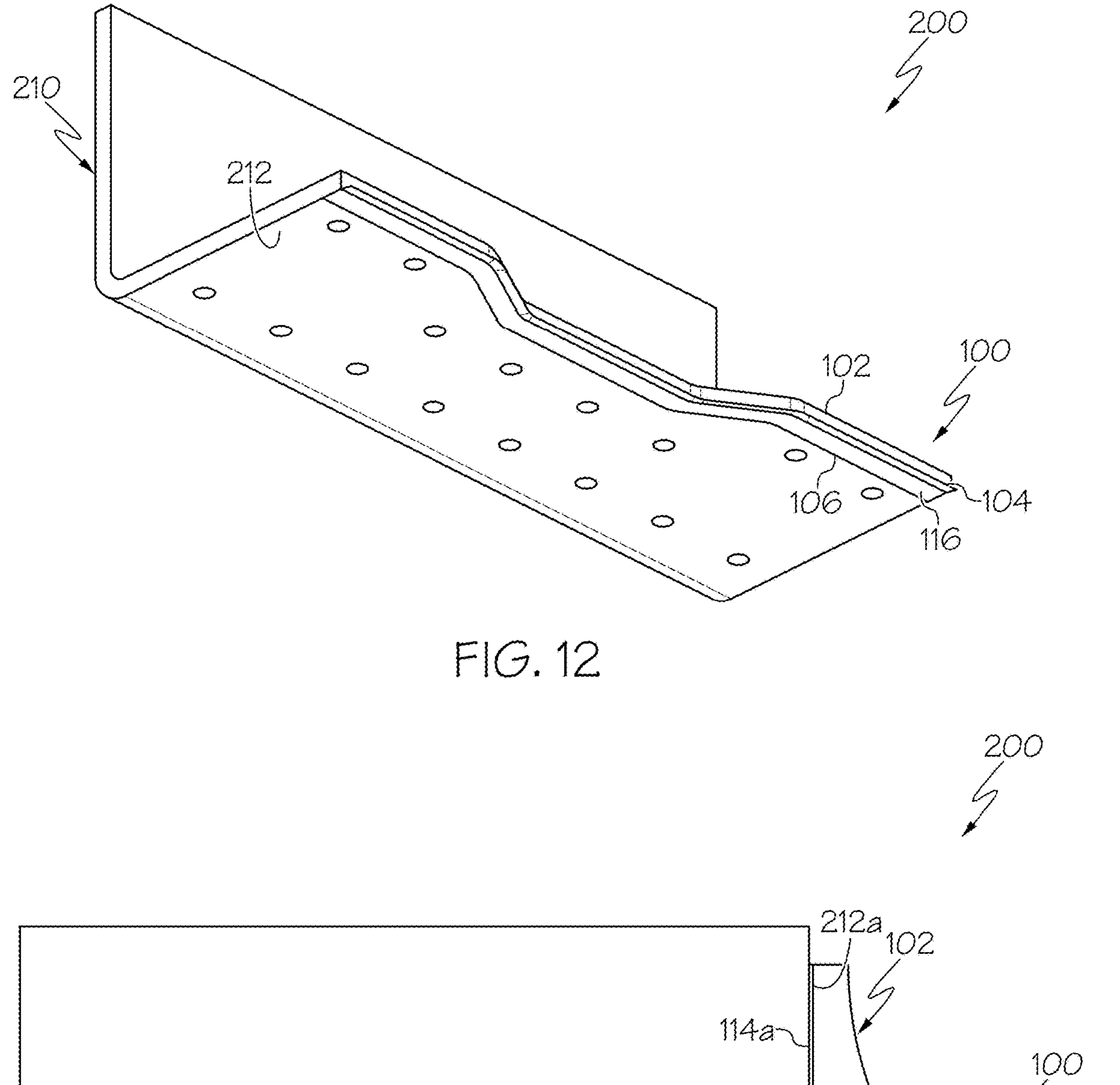
FIG. 12 is a schematic, perspective view of the first component and the molded seal boot of FIG. 11.
FIG. 13 is a schematic, elevation view of an example of the first component and an example of the molded seal boot.

As illustrated in FIGS. 3-5, generally, the body 118 of the seal boot 100 extends along the longitudinal axis A. In one or more examples, the body 118 and the longitudinal axis A includes a curvature in a virtual plane P (FIG. 4). In one or more examples, the body 118 and the longitudinal axis A is straight within the virtual plane P. As illustrated in FIGS. 10-12, in these examples, the body 118 is designed to follow the contour of the joint 230 formed between the first component 210 and the second component 220.

As illustrated in FIG. 5, in one or more examples, the seal boot 100 includes a plurality of segments 130. In these examples, the plurality of segments 130 is coupled together along the longitudinal axis A, for example, using the fay sealant 240. Each one of the segments 130 includes or forms a portion or segment of the body 118, including the base 102, the toe 104, the fillet surface 112, the first fay surface 114, the second fay surface 116, the heel 106 (when present), and the cap 108 (when present).

Referring now to FIGS. 1 and 10-21, the following are examples of the structure 200, according to the present disclosure. Examples of the structure 200 include a number of elements, features, and components. Not all of the elements, features, and/or components described or illustrated in one example are required in that example. Some or all of the elements, features, and/or components described or illustrated in one example can be combined with other examples in various ways without the need to include other elements, features, and/or components described in those other examples, even though such combination or combinations are not explicitly described or illustrated by example herein.

In one or more examples, the structure 200 includes the first component 210 and the second component 220. In one or more examples, the first component 210 is the spar 1232 that forms a portion of the fuel tank 1230. In one or more examples, the second component 220 is the skin panel 1234 that forms a portion of the fuel tank 1230.

The first component 210 includes the first-component fay surface 212. The second component 220 includes the second-component fay surface 222. The structure 200 includes the joint 230 that is formed by or between the first component 210 and the second component 220.

The structure 200 also includes the seal boot 100. The seal boot 100 is coupled to the first component 210 and to the second component 220. The seal boot 100 is configured for forming the barrier seal 250 over and/or along the joint 230 between the first component 210 and the second component 220.

In one or more examples of the structure 200, the seal boot 100 includes the base 102 and the toe 104 extending from the base 102. The seal boot 100 includes the fillet surface 112 that is formed by the base 102 and the toe 104. The seal boot 100 includes the first fay surface 114 that is at least partially formed by the base 102 and that is coupled to the first-component fay surface 212. The seal boot 100 includes the second fay surface 116 that is at least partially formed by the toe 104 and that is coupled to the second-component fay surface 222.

In one or more examples, the structure 200 includes the fay sealant 240. In one or more examples, the fay sealant 240 is an adhesive sealant used in aerospace applications. In one or more examples, the fay sealant 240 is made of the sealant material 110. In one or more examples, the seal boot 100 and the fay sealant 240 are made of substantially the same materials (e.g., sealant material 110).

As illustrated in FIGS. 14-16, in one or more examples, the fay sealant 240 (e.g., a portion of or an amount of the fay sealant 240) is disposed between the first fay surface 114 and the first-component fay surface 212. In one or more examples, the fay sealant 240 (e.g., a portion of or an amount of the fay sealant 240) is disposed between the second fay surface 116 and the second-component fay surface 222. In one or more examples, the fay sealant 240 (e.g., a portion of or an amount of the fay sealant 240) is disposed between the first-component fay surface 212 and the second-component fay surface 222.

In one or more examples of the structure 200, the first component 210 includes a notch 214. The notch 214 is formed in the first-component fay surface 212. In one or more examples, the notch 214 is formed in the second portion 212*b* of the first-component fay surface 212. In one or more examples, the notch 214 extends along and is proximate to the second corner or edge formed or shared by the first portion 212*a* and the second portion 212*b* of the first-component fay surface 212. The notch 214 is configured (e.g., sized and shaped) for receiving or otherwise accommodating the heel 106 of the seal boot 100.

In one or more examples of the structure 200, the seal boot 100 includes the heel 106. The heel 106 extends from the base 102 opposite the toe 104. The heel 106 is received by the notch 214. In one or more examples of the structure 200, a portion (e.g., second portion 114*b*) of the first fay surface 114 is formed by the heel 106. A portion (e.g., second portion 116*b*) of the second fay surface 116 is formed by the heel 106. In these examples, the second portion of the first fay surface 114 formed by the heel 106 is coupled to second portion 212*b* of the first-component fay surface 212 of the first component 210. In these examples, the second portion 116*b* of the second fay surface 116 formed by the heel 106 is coupled to the second-component fay surface 222 of the second component 220.

In one or more examples of the structure 200, the seal boot 100 includes the cap 108 that extends from the base 102. In one or more examples, a portion (e.g., third portion 114*c*) of the first fay surface 114 is formed by the cap 108. In these examples, the third portion 114*c* of the first fay surface 114 formed by the cap 108 is coupled to the third portion 212*c* of the first-component fay surface 212 of the first component 210.

Figure 2:
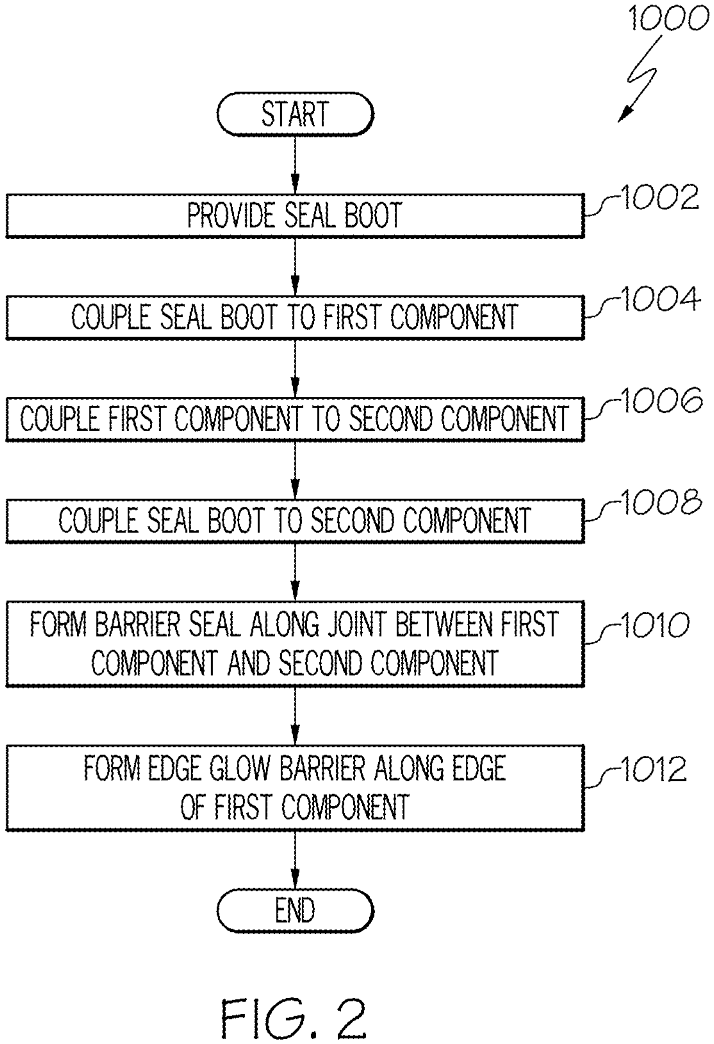
FIG. 2 is a flow diagram of an example of a method for sealing a structure.

Referring now to FIG. 2, the following are examples of the method 1000, according to the present disclosure. Examples of the method 1000 include a number of elements, steps, operations, or processes. Not all of the elements, steps, operations, or processes described or illustrated in one example are required in that example. Some or all of the elements, steps, operations, or processes described or illustrated in one example can be combined with other examples in various ways without the need to include other elements, steps, operations, or processes described in those other examples, even though such combination or combinations are not explicitly described or illustrated by example herein.

In one or more examples, the method 1000 includes a step of providing 1002 the seal boot 100. The seal boot 100 includes the base 102 and the toe 104 that extends from the base 102. The seal boot 100 includes the fillet surface 112 that is formed by the base 102 and the toe 104. The seal boot 100 includes the first fay surface 114 that is at least partially formed by the base 102. The seal boot 100 includes the second fay surface 116 that is at least partially formed by the toe 104.

In one or more examples, the method 1000 includes a step of coupling 1004 the seal boot 100 to the first component 210. In one or more examples, the step of coupling 1004 includes a step of coupling the first fay surface 114 of the seal boot 100 to the first-component fay surface 212 of the first component 210. In one or more examples, the first fay surface 114 of the seal boot 100 is coupled to the first-component fay surface 212 of the first component 210 using the fay sealant 240 or other adhesive sealant that is applied to at least one of the first fay surface 114 and the first-component fay surface 212.

In one or more examples, the first portion 114*a* of the first fay surface 114 formed by the base 102 is coupled to the first portion 212*a* of the first-component fay surface 212. In one or more examples, the second portion 114*b* of the first fay surface 114 formed by the heel 106 is coupled to the second portion 212*b* of the first-component fay surface 212. In one or more examples, the third portion 114*c* of the first fay surface 114 is coupled to the third portion 212*c* of the first-component fay surface 212.

In one or more examples, the step of coupling 1004 the seal boot 100 to the first component 210 includes a step of positioning the heel 106 within or aligning the heel 106 along the notch 214 formed in the second portion 212*b* of the first-component fay surface 212 of the first component 210.

In one or more examples, the method 1000 includes a step of coupling 1006 the first component 210 and the second component 220 together. In one or more examples, the method 1000 also includes a step of coupling 1008 the seal boot 100 and the second component 220 together.

In one or more examples, the first component 210 and the seal boot 100 are coupled to the second component 220 concurrently. In one or more examples, the method 1000, such as the steps of coupling 1006 the first component 210 and the second component 220 together and the step of coupling 1008 the seal boot 100 and the second component 220 together, includes a step of coupling the first-component fay surface 212 and the second fay surface 116 to the second-component fay surface 222 of the second component 220.

In one or more examples, the step of coupling 1006 includes a step of coupling the second portion 212*b* of the first-component fay surface 212 and the second-component fay surface 222 of the second component 220 together. In one or more examples, the first component 210 and the second component 220 are coupled together using the fay sealant 240 or other adhesive sealant that is applied to at least one of the first-component fay surface 212 and the second-component fay surface 222. In one or more examples, a fourth portion **212*d* of the first-component fay surface 212 of the first component 210 is coupled to a third portion 222*c* of the second-component fay surface 222 of the second component 220**.

In one or more examples, the step of coupling 1008 includes a step of coupling the second fay surface 116 of the seal boot 100 to the second-component fay surface 222 of the second component 220. In one or more examples, the second fay surface 116 of the seal boot 100 is coupled to the second-component fay surface 222 of the second component 220 using the fay sealant 240 or other adhesive sealant that is applied to at least one of the second fay surface 116 and the second-component fay surface 222.

In one or more examples, the first portion **116*a* of the second fay surface 116 formed by the toe 104 is coupled to a first portion 222*a* of the second-component fay surface 222. In one or more examples, the second portion 116*b* of the second fay surface 116 formed by the heel 106 is coupled to a second portion 222*b* of the second-component fay surface 222**.

As illustrated in FIGS. 15 and 16, in one or more examples, with the seal boot 100 coupled to the first component 210, the toe 104 is angularly oriented downward such that the toe 104 contacts the second-component fay surface 222 of the second component 220 first. As the first component 210 and the second component 220 are placed into contact and coupled together, the toe 104 flexes or bends in an upward direction when contacting the second-component fay surface 222 of the second component 220.

As illustrated in FIGS. 15 and 16, in one or more examples, with the seal boot 100 coupled to the first component 210, the heel 106 is situated in the notch 214 formed in the first-component fay surface 212 of the first component 210. As the first component 210 and the second component 220 are place into contact and coupled together, the heel 106 is clamped between the first-component fay surface 212 and the second-component fay surface 222 to prevent the seal boot 100 from slipping out of place when the toe 104 is compressing against the second-component fay surface 222 of the second component 220.

In one or more examples, the method 1000 includes a step of forming 1010 the barrier seal 250 over the joint 230 between the first component 210 and the second component 220. The joint 230 is formed when coupling the first component 210 and the second component 220 together. In these examples, the method 1000 includes forming the joint 230 in response to the step of coupling 1006 the first component 210 and the second component 220 together. In one or more examples, the barrier seal 250 is a liquid barrier seal. In one or more examples, the barrier seal 250 is a gas barrier seal.

In one or more examples, the method 1000 includes a step of forming 1012 the edge glow barrier 252 along an edge 216 of the first component 210. In one or more examples, the edge 216 of the first component 210 is the second (e.g., upper) corner or edge formed or shared by the first portion **212*a* and the third portion 212*c* of the first-component fay surface 212. In one or more examples, the edge glow barrier 252 is formed by the cap 108 and/or an end of the base 102**.

Figure 22:
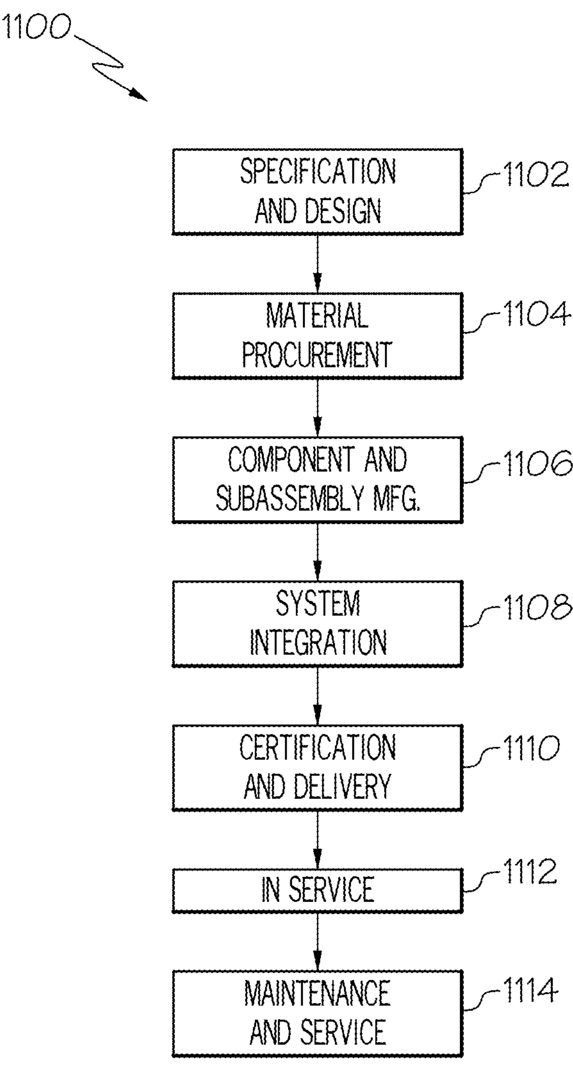
FIG. 22 is a flow diagram of an example of an aircraft manufacturing and service method.
Figure 23:
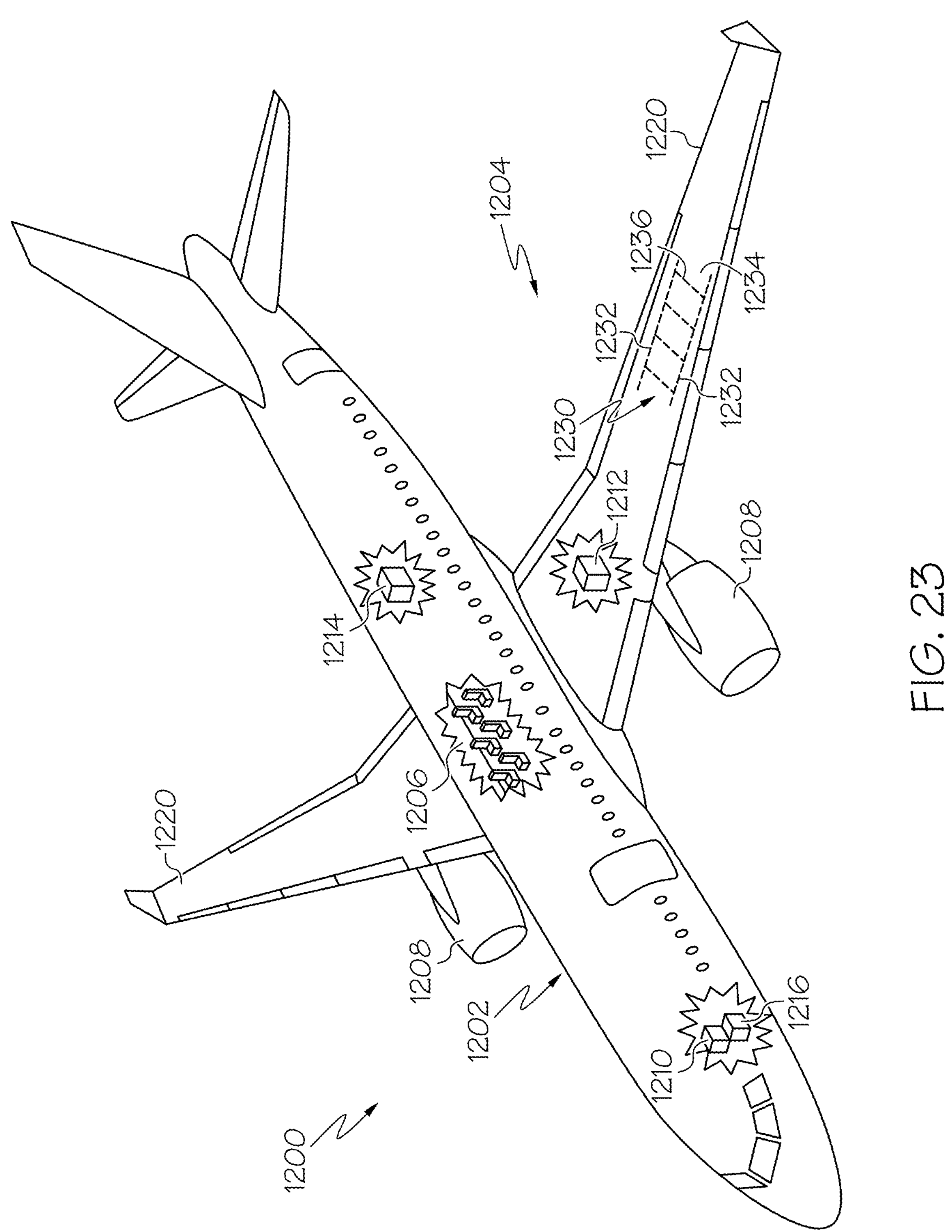
FIG. 23 is a schematic block diagram of an example of an aircraft.

Referring now to FIGS. 22 and 23 examples of the seal boot 100, the structure 200, and the method 1000, described herein, may be related to, or used in the context of, the aerospace manufacturing and service method 1100, as shown in the flow diagram of FIG. 22 and an aircraft 1200, as schematically illustrated in FIG. 23. As an example, the aircraft 1200 and/or the manufacturing and service method 1100 may utilize the structure 200 (e.g., fuel tank 1230) that is sealed using the seal boot 100 and/or according to the method 1000.

Referring to FIG. 23, which illustrates an example of the aircraft 1200. The aircraft 1200 can be any aerospace vehicle or platform. In one or more examples, the aircraft 1200 includes the airframe 1202 having the interior 1206. The aircraft 1200 includes a plurality of onboard systems 1204 (e.g., high-level systems). Examples of the onboard systems 1204 of the aircraft 1200 include propulsion systems 1208, hydraulic systems 1212, electrical systems 1210, and environmental systems 1214. In other examples, the onboard systems 1204 also includes one or more control systems coupled to the airframe 1202 of the aircraft 1200. In yet other examples, the onboard systems 1204 also include one or more other systems 1216, such as, but not limited to, communications systems, avionics systems, software distribution systems, network communications systems, passenger information/entertainment systems, guidance systems, radar systems, weapons systems, and the like.

The aircraft 1200 can have any number of structures (e.g., structure 200) that are sealed using one or more instances of the seal boot 100 and/or according to the method 1000. As an example, the structure 200 is an example of the fuel tank 1230 of the aircraft 1200, which is formed by components of the wing 1220 and sealed using the seal boot 100. As another examples the first component 210 is the spar 1232 or a rib 1236 of the airframe 1202, such as of a wing box of the wing 1220, and the second component 220 is the skin panel 1234 of the aircraft 1200, such as of the wing 1220, that in combination form the fuel tank 1230.

Referring to FIG. 22, during pre-production of the aircraft 1200, the manufacturing and service method 1100 includes specification and design 1102 of the aircraft 1200 and material procurement 1104. During production of the aircraft 1200, component and subassembly manufacturing 1106 and system integration 1108 of the aircraft 1200 take place. Thereafter, the aircraft 1200 goes through certification and delivery 1110 to be placed in service 1112. Routine maintenance and service 1114 includes modification, reconfiguration, refurbishment, etc. of one or more systems of the aircraft 1200.

Each of the processes of the manufacturing and service method 1100 illustrated in FIG. 22 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Examples of the seal boot 100, the structure 200, and the method 1000, shown and described herein, may be employed during any one or more of the stages of the manufacturing and service method 1100 shown in the flow diagram illustrated by FIG. 22 In an example, one or more structures 200 of the aircraft 1200 can be sealed using the seal boot 100 and/or according to the method 1000 during a portion of component and subassembly manufacturing 1106 and/or system integration 1108. Further, one or more structures 200 of the aircraft 1200 can be sealed using the seal boot 100 and/or according to the method 1000 while the aircraft 1200 is in service 1112. Also, one or more structures 200 of the aircraft 1200 can be sealed using the seal boot 100 and/or according to the method 1000 during system integration 1108 and certification and delivery 1110. Similarly, one or more structures 200 of the aircraft 1200 can be sealed using the seal boot 100 and/or according to the method 1000 while the aircraft 1200 is in service 1112 and during maintenance and service 1114.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1, 3-21 and 23, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1, 3-21 and 23, referred to above, need be included in every example and not all elements, features, and/or components described herein are necessarily depicted in each illustrative example. Accordingly, some of the elements, features, and/or components described and illustrated in FIGS. 1, 3-21 and 23 may be combined in various ways without the need to include other features described and illustrated in FIGS. 1, 3-21 and 23, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1, 3-21 and 23, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1, 3-21 and 23, and such elements, features, and/or components may not be discussed in detail herein with reference to each of FIGS. 1, 3-21 and 23. Similarly, all elements, features, and/or components may not be labeled in each of FIGS. 1, 3-21 and 23, but reference numerals associated therewith may be utilized herein for consistency.

In FIGS. 2 and 22, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 2 and 22 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but does not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the seal boot 100, the structure 200, and the method 1000 have been shown and described, modifications may occur to those skilled in the art upon reading the specification. The present application includes such modifications and is limited only by the scope of the claims.

What is claimed is:

1. A seal boot comprising:

a single, continuous body comprising:

a base;

a toe extending from the base;

a fillet surface formed by the base and the toe;

a first fay surface at least partially formed by the base; and a second fay surface at least partially formed by the toe, wherein the second fay surface formed by the toe is non-perpendicular and non-parallel to the first fay surface formed by the base.

2. The seal boot of claim 1, wherein the toe and the base are flexible relative to each other such that an angle between the second fay surface formed by the toe and the first fay surface formed by the base can change.

3. The seal boot of claim 1, further comprising a heel extending from the base opposite the toe, wherein:

a portion of the first fay surface is formed by the heel; and a portion of the second fay surface is formed by the heel.

4. The seal boot of claim 3, wherein the heel is perpendicular to the base.

5. The seal boot of claim 1, wherein the fillet surface is concave.

6. The seal boot of claim 1, further comprising a cap extending from the base, wherein a portion of the first fay surface is formed by the cap.

7. The seal boot of claim 6, further comprising at least one groove formed in the portion of the first fay surface formed by the cap.

8. The seal boot of claim 1, further comprising at least one stiffener extending from the fillet surface.

9. The seal boot of claim 1, further comprising at least one recess formed in a portion of the second fay surface formed by the toe.

10. The seal boot of claim 1, further comprising at least one relief valve formed in the toe between the second fay surface and the fillet surface.

11. The seal boot of claim 1, wherein the single, continuous body comprises a sealant material that is molded and cured.

12. The seal boot of claim 1, further comprising a longitudinal axis, wherein:

the base and the toe extend along the longitudinal axis; and the base and the toe are flexible along the longitudinal axis.

13. The seal boot of claim 12, wherein the longitudinal axis comprises a curvature in a virtual plane.

14. The seal boot of claim 12, further comprising a plurality of body segments, wherein the plurality of segments is coupled together along the longitudinal axis.

15. A structure comprising:

a first component comprising a first-component fay surface;

a second component comprising a second-component fay surface; and a seal boot configured for forming a barrier seal over a joint between the first component and the second component, wherein the seal boot comprises a single, continuous body comprising:

a base;

a toe extending from the base;

a fillet surface formed by the base and the toe;

a first fay surface at least partially formed by the base and coupled to the first-component fay surface; and a second fay surface at least partially formed by the toe and coupled to the second-component fay surface, wherein the second fay surface formed by the toe is non-perpendicular and non-parallel to the first fay surface formed by the base prior to the seal boot being coupled to the first component and the second component over the joint.

16. The structure of claim 15, further comprising a fay sealant disposed between the first fay surface and the first-component fay surface, between the second fay surface and the second-component fay surface, and between the first-component fay surface and the second-component fay surface.

17. The structure of claim 15, wherein:

the first component comprises a notch formed in the first-component fay surface;

the seal boot further comprises a heel extending from the base opposite the toe received by the notch;

a portion of the first fay surface is formed by the heel; and a portion of the second fay surface is formed by the heel.

18. The structure of claim 15, wherein:

the seal boot further comprises a cap extending from the base; and a portion of the first fay surface is formed by the cap.

19. A method for sealing a structure, the method comprising:

providing a seal boot comprising a single, continuous body comprising:

a base;

a toe extending from the base;

a fillet surface formed by the base and the toe;

a first fay surface at least partially formed by the base; and a second fay surface at least partially formed by the toe;

coupling the first fay surface of the seal boot to a first-component fay surface of a first component;

coupling the first-component fay surface and the second fay surface to a second-component fay surface of a second component; and forming a barrier seal over a joint between the first component and the second component, wherein the second fay surface formed by the toe is non-perpendicular and non-parallel to the first fay surface formed by the base prior to the seal boot being coupled to the first component and the second component over the joint.

20. The method of claim 19, further comprising forming an edge glow barrier along an edge of the first component.

* * * * *